Nov. 11, 1930.                H. J. NESS ET AL                1,781,241
            METHOD OF MAKING ROLLER BEARING CAGES
                  Original Filed April 25, 1928
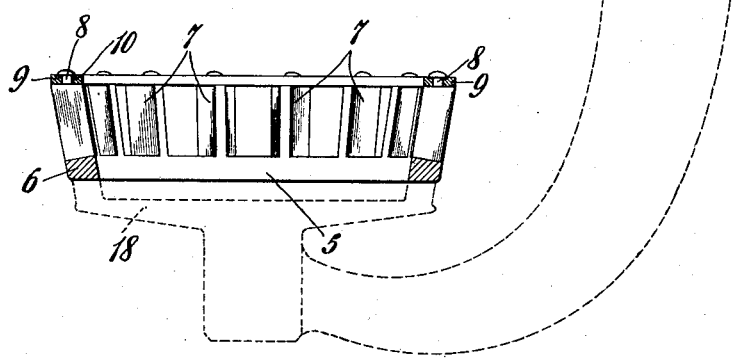
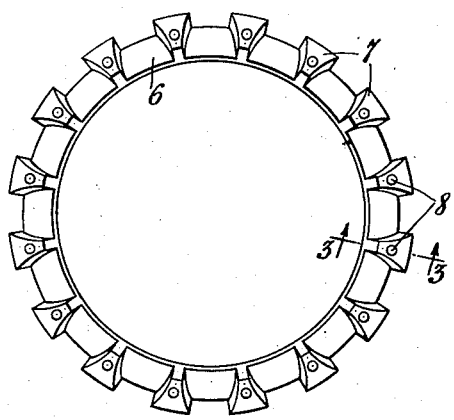
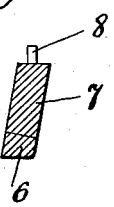
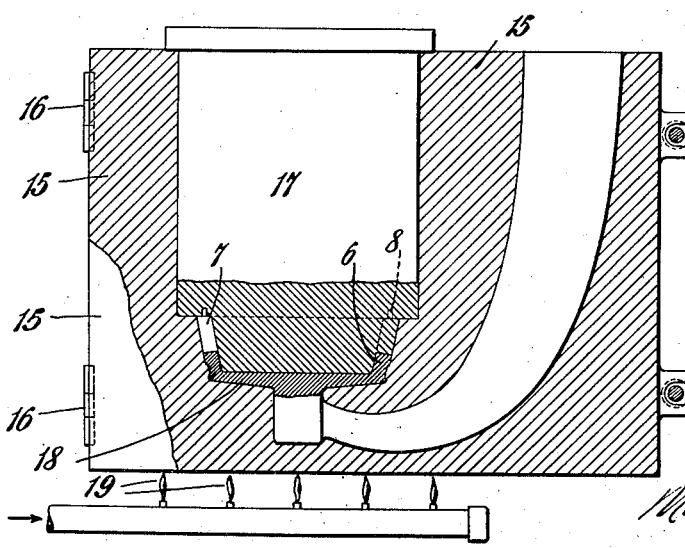
Inventors:
Harold J. Ness and
Clarence H. Roth
BY
Maurice B. Landis
              ATTORNEY Patented Nov. 11, 1930

1,781,241

UNITED STATES PATENT OFFICE

HAROLD J. NESS AND CLARENCE H. ROTH, OF JERSEY CITY, NEW JERSEY, ASSIGNORS TO THE NEW DEPARTURE MANUFACTURING COMPANY, OF BRISTOL, CONNECTICUT, A CORPORATION OF CONNECTICUT

METHOD OF MAKING ROLLER-BEARING CAGES

Application filed April 25, 1928, Serial No. 272,821. Renewed April 3, 1930.

The present invention relates to bearing cages and has for an object to provide a method by which bearing cages of improved quality can be manufactured expeditiously and economically.

Bearing cages have, in general, been produced by methods necessitating a number of operations usually of a character requiring particularly skilled operatives, in order that the desired accuracy and quality of the product might be obtained. The present invention provides a method by which a bearing cage can be made of two cast parts secured together by a simple operation and involving relatively little machine work.

The nature and objects of the invention will be better understood from a description of a particular illustrative embodiment thereof, for the purpose of which description reference should be had to the accompanying drawing forming a part hereof and in which—

Figure 1 is a sectional view of the two parts of the bearing cage shown in full lines, the shape of the gate forming a part of the blank of the principal part of the cage being shown in dotted lines, Figure 2 is a plan view of the principal part of the bearing cage, Figure 3 is a sectional view taken on the line III—III of Fig. 2, and Figure 4 is a sectional view indicating the method of casting the principal part of the bearing cage and showing the cage in a mold.

The bearing cage shown for the purpose of illustrating the invention is of the type used with conical bearings and comprises a main body portion 5 consisting of an annular member 6 connecting the several spacer members or spacer bars 7, having projections 8 together with a separate annular member 9 having holes 10 for receiving the proje tions 8. In the finished bearing cage the projections 8 are riveted to hold the ring 9 firmly in position.

The method to be described involves casting the main part of the cage in metal molds by a process which affords metal of good quality throughout the cage and which can be accomplished with relatively little loss from defective castings. The cage shown is made of aluminum cast in a steel mold, as indicated in Fig. 4. As shown, the mold consists of a pair of female members 15, 15 hinged together, as at 16, and a male member 17 which, in the arrangement shown, may be lifted vertically out of the two-part female mold after each casting operation. It has been found that the metal of the cage will be of a good quality throughout if the gate is made to include a distributing gate in the form of a complete disc extending entirely across the bearing cage, as indicated at 18, to distribute the metal equally to all parts of the casting and a pouring gate leading to the centre of the disc gate on the underside thereof. The disc gate is preferably relatively deep at the centre and more shallow toward the edges where it connects with the annular portion 6 of the cage.

In the casting operation the mold is closed and molten aluminum at a temperature approximating 1300 degrees Fahr. is poured by gravity into the gate until the mold is completely filled. The mold is maintained at a temperature approximating 600 degrees Fahr. during the casting operation, as by means of one or more gas flames indicated conventionally at 19. Ordinarily it is sufficient to apply heat to the outer mold 15. The inner mold 17 will be sufficiently heated by contact with the outer mold or by absorbing heat from the metal during the casting operation. As soon as the aluminum is sufficiently chilled the blank is removed. It is then put in a lathe and the gate cut away to leave the finished cage part 5. The ring 9 constituting the second part of the cage may be similarly cast or, if desired, it may be manufactured from sheet aluminum by stamping and dieing operations.

It has been found that by casting the principal part of the bearing cage in the manner described, a bearing cage can be manufactured by relatively unskilled labor and yet a cage of good quality will be afforded. The assembling of the parts involves merely placing the ring 9 on the lugs 8 and riveting over said lugs to form the finished cage.

The foregoing specific description is illustrative merely and is not intended as defining the limits of the invention.

We claim:

1. The method of making a two-piece cast aluminum bearing cage which comprises casting, by the gravity method in a metal mold heated to approximately 600 degrees Fahr., a blank consisting of one end ring and spacing members projecting therefrom, together with a gate comprising a disc extending entirely across said ring and having a feed extension leading from its centre, cooling the blank and cutting said gate away from the cage blank and riveting a second end ring to the free ends of the spacer members to complete the cage, substantially as described.

2. The method of making a two-piece cast bearing cage which comprises casting, in a metal mold, a blank consisting of one end ring and spacing members projecting therefrom, together with a gate comprising a disc extending entirely across said ring, cooling the blank, and cutting said gate away from the cage blank, and securing a second end ring to the free ends of the spacer members to complete the cage, substantially as described.

In testimony whereof, we have signed our names to this specification this 14th day of January, 1928.

CLARENCE H. ROTH.
HAROLD J. NESS.